May 14, 1963 J. PAISLEY 3,089,577
APPARATUS FOR MARSHALLING A GROUP OF ARTICLES IN SPACED ROWS
Filed Sept. 27, 1960 15 Sheets-Sheet 1
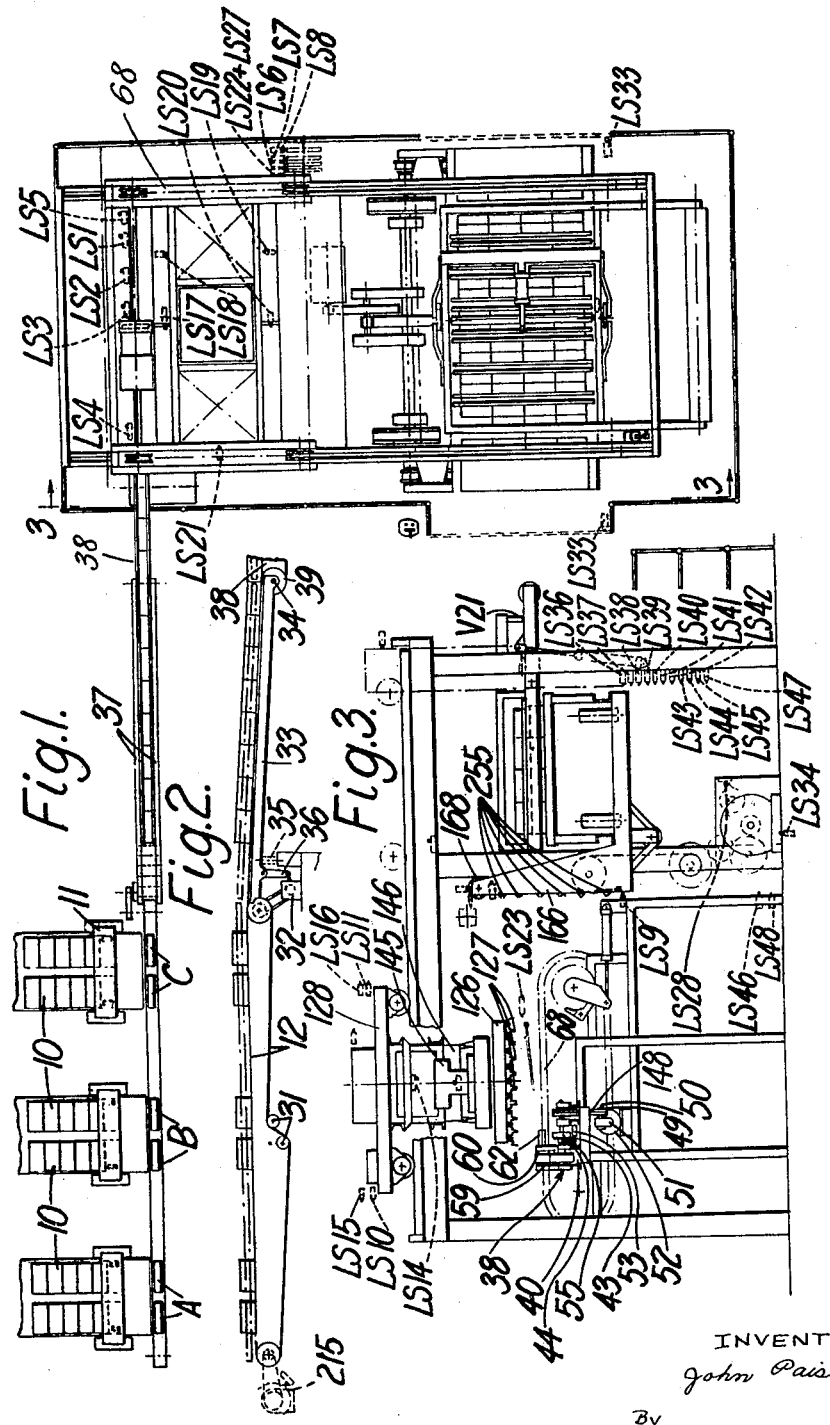
INVENTOR
John Paisley
By
Watson, Cole, Grindle & Watson
ATTORNEYS

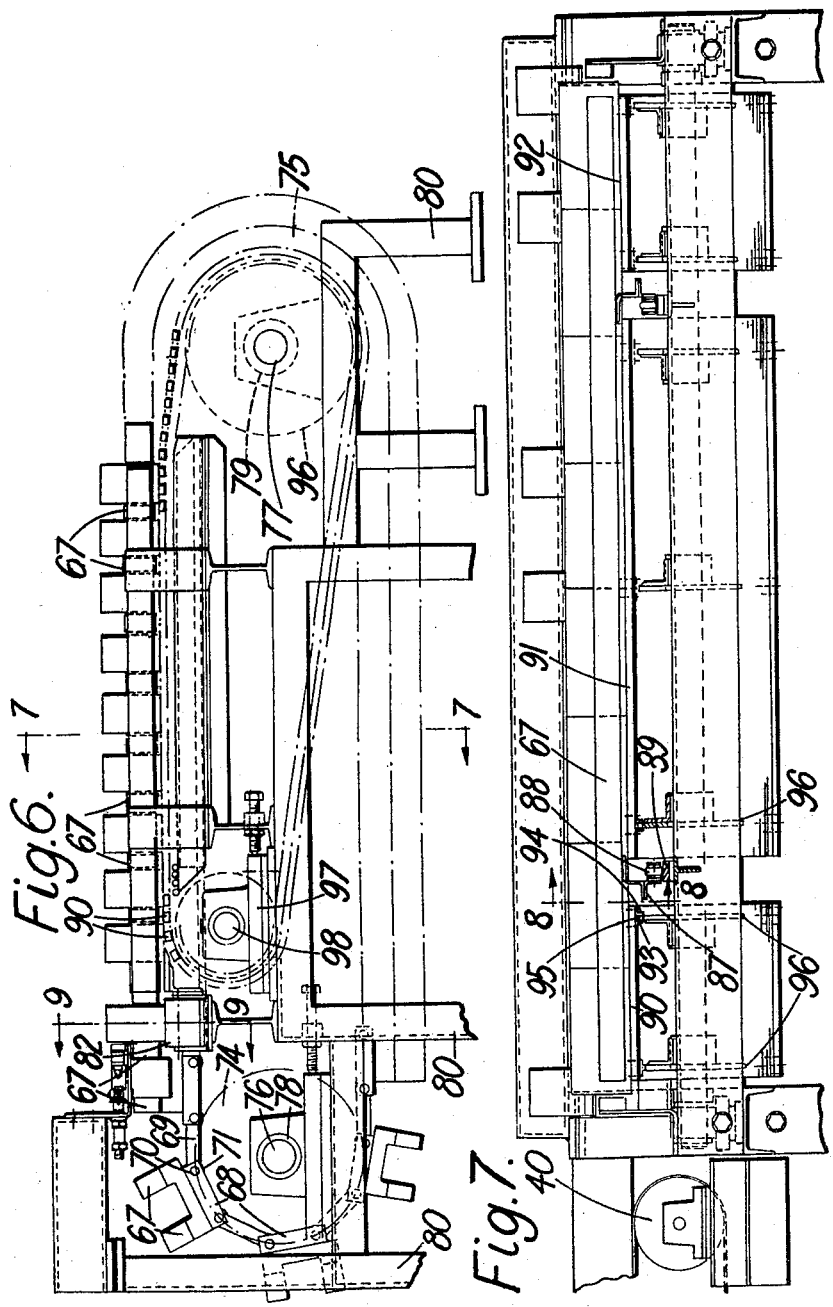

May 14, 1963 J. PAISLEY 3,089,577
APPARATUS FOR MARSHALLING A GROUP OF ARTICLES IN SPACED ROWS
Filed Sept. 27, 1960 15 Sheets-Sheet 4
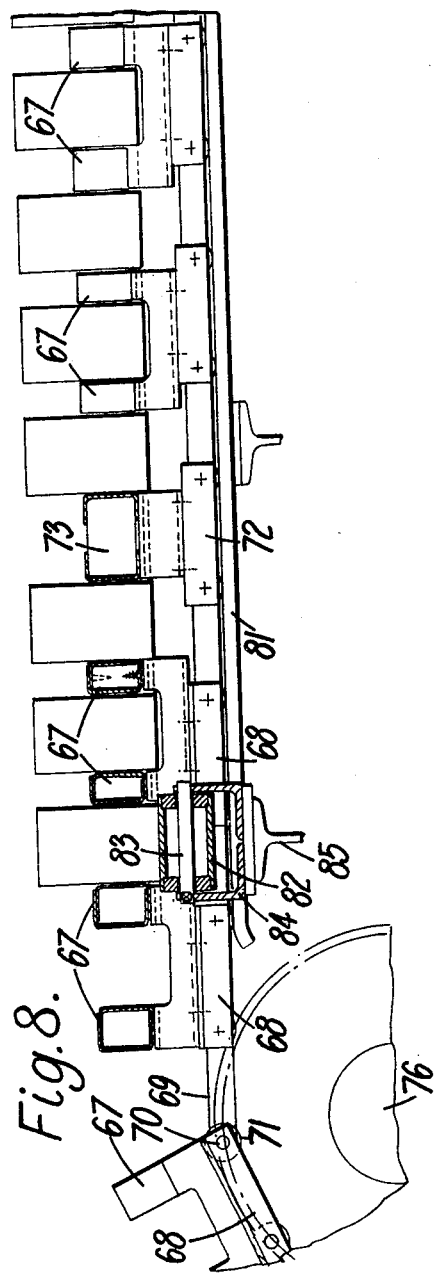
INVENTOR
John Paisley
By
Watson, Cole, Grindle & Watson
ATTORNEYS May 14, 1963    J. PAISLEY    3,089,577
APPARATUS FOR MARSHALLING A GROUP OF ARTICLES IN SPACED ROWS
Filed Sept. 27, 1960    15 Sheets-Sheet 5
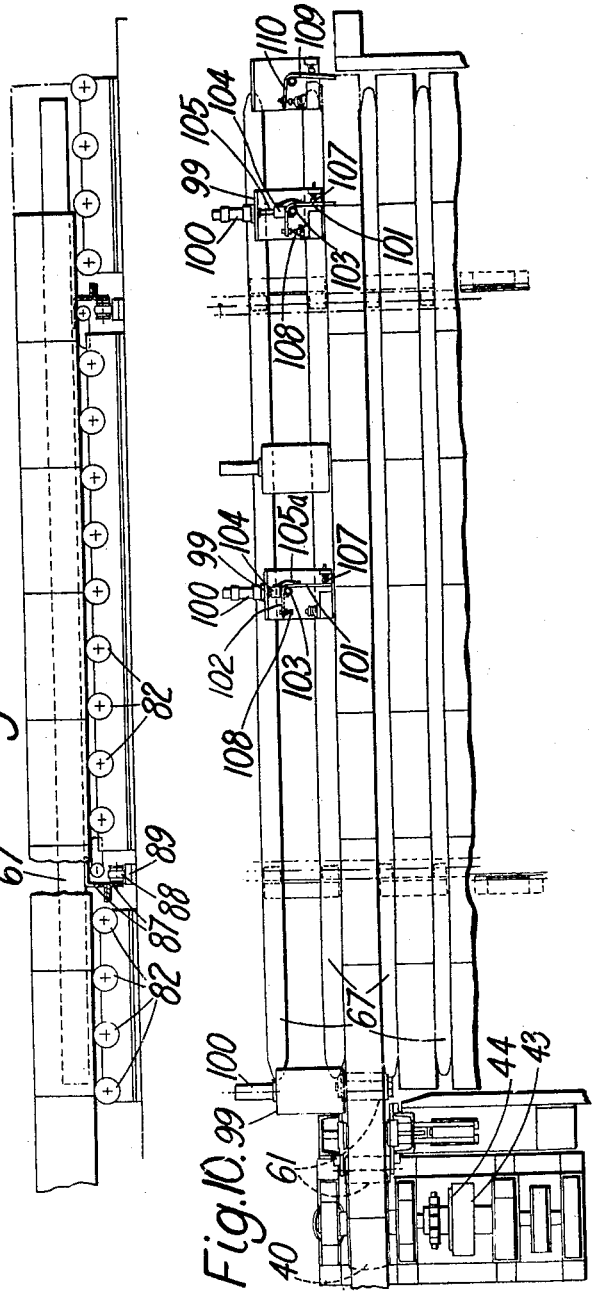
INVENTOR
John Paisley
By
Watson, Cole, Grindle & Watson
ATTORNEYS May 14, 1963 J. PAISLEY 3,089,577
APPARATUS FOR MARSHALLING A GROUP OF ARTICLES IN SPACED ROWS
Filed Sept. 27, 1960 15 Sheets-Sheet 6

INVENTOR
John Paisley
BY
Watson, Cole, Grindle & Watson
ATTORNEYS

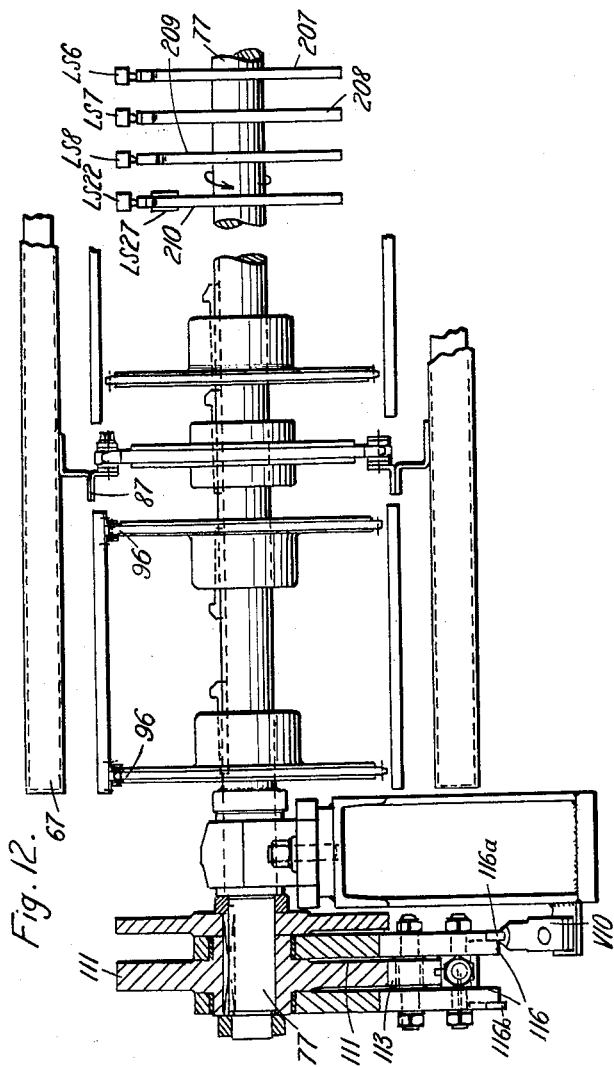

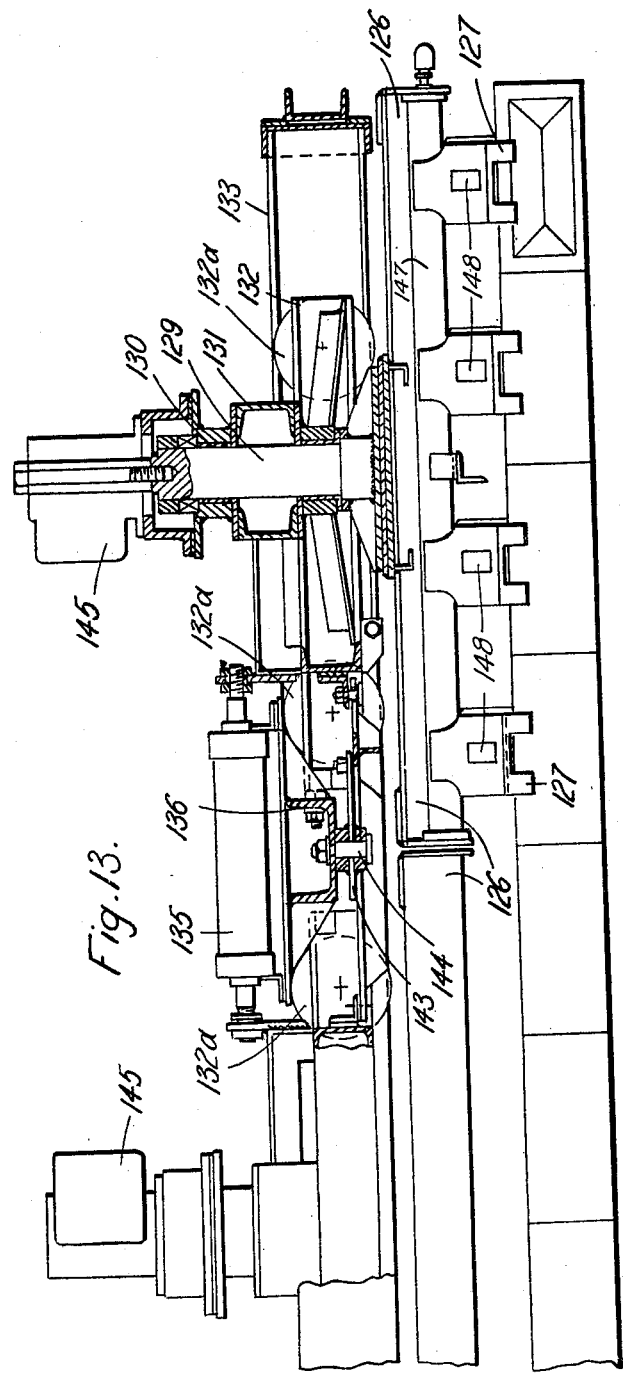

May 14, 1963 J. PAISLEY 3,089,577
APPARATUS FOR MARSHALLING A GROUP OF ARTICLES IN SPACED ROWS
Filed Sept. 27, 1960 15 Sheets-Sheet 9
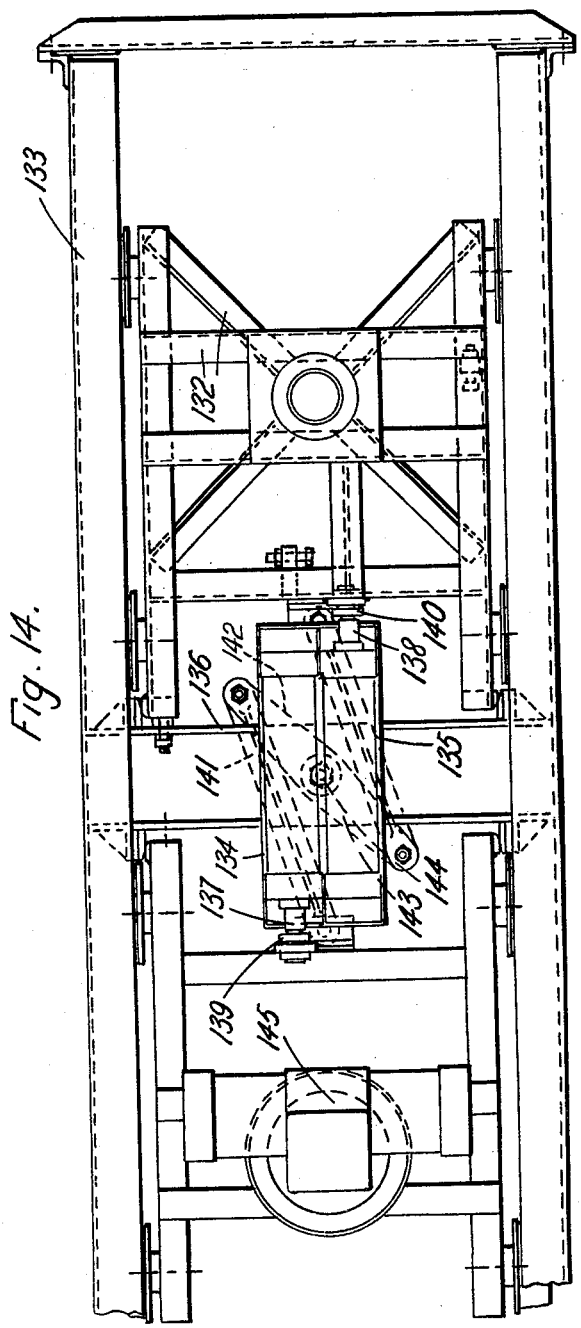
INVENTOR
John Paisley
By
Watson, Cole, Grindle & Watson
ATTORNEYS May 14, 1963  J. PAISLEY  3,089,577
APPARATUS FOR MARSHALLING A GROUP OF ARTICLES IN SPACED ROWS
Filed Sept. 27, 1960  15 Sheets-Sheet 10
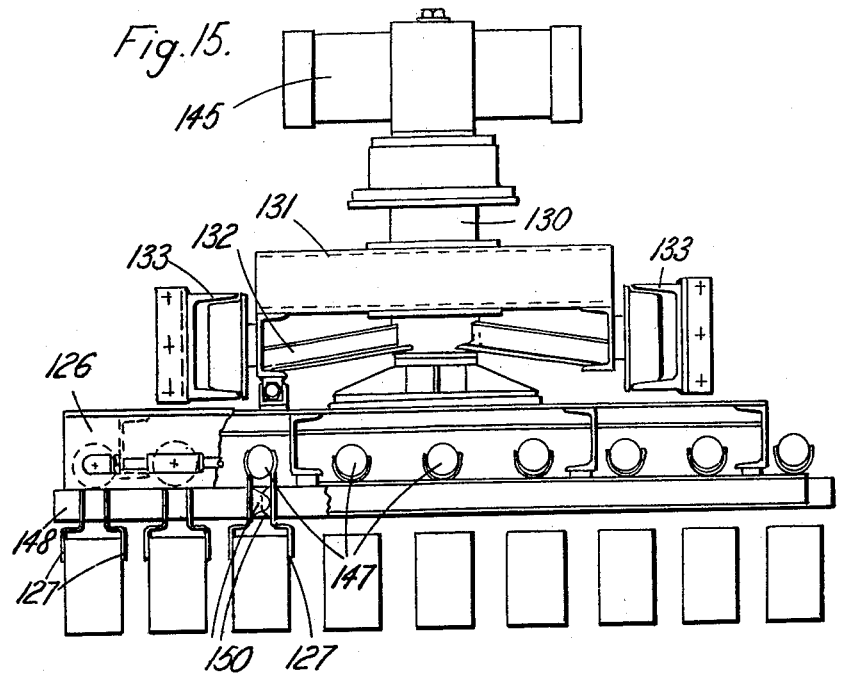
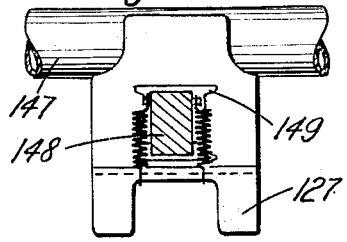
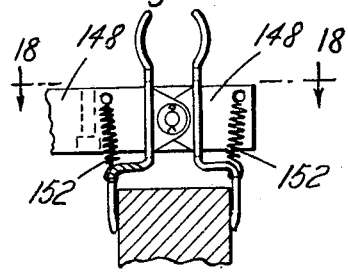
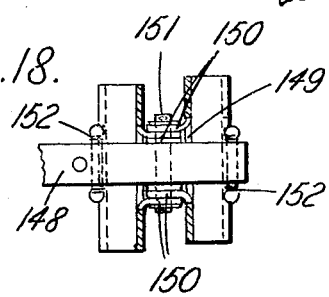
INVENTOR
John Paisley
By
Watson, Cole, Grindle & Watson
ATTORNEYS

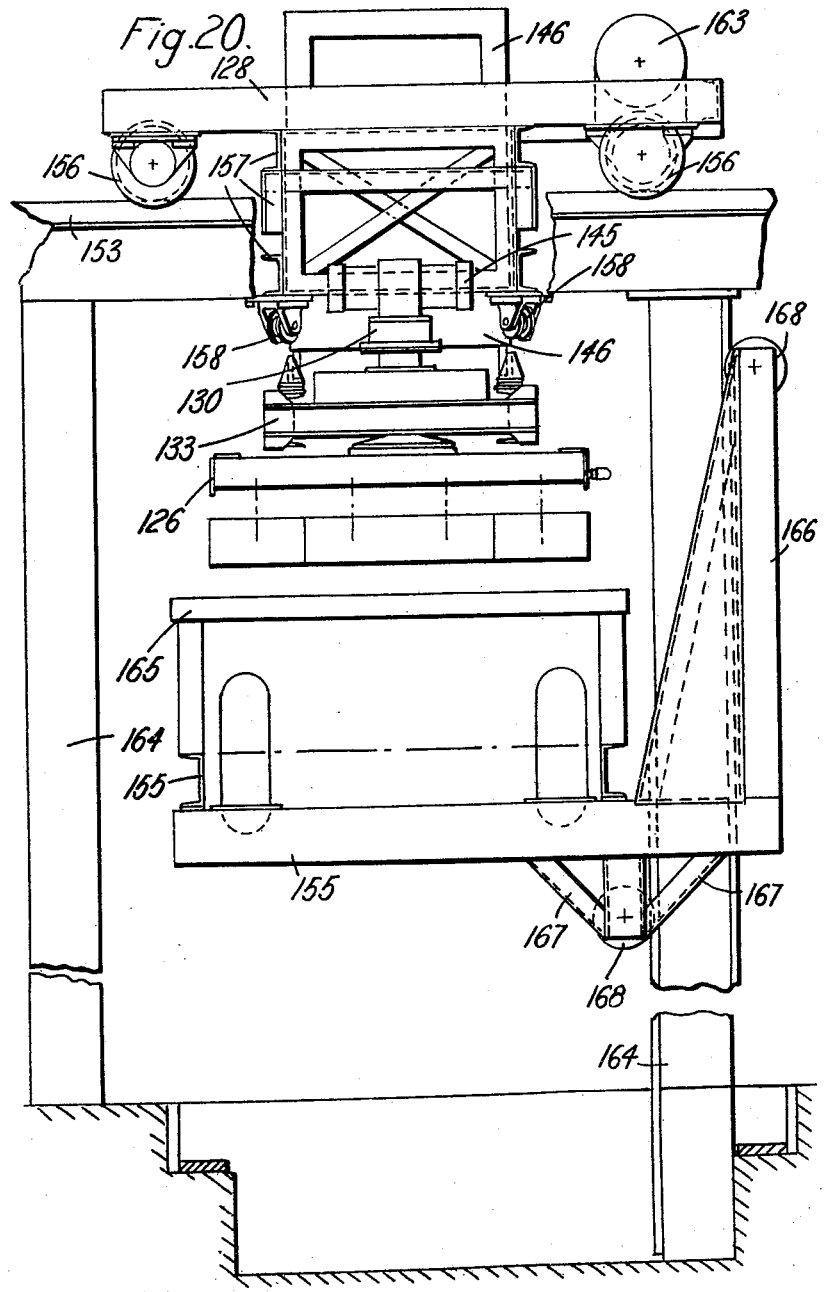

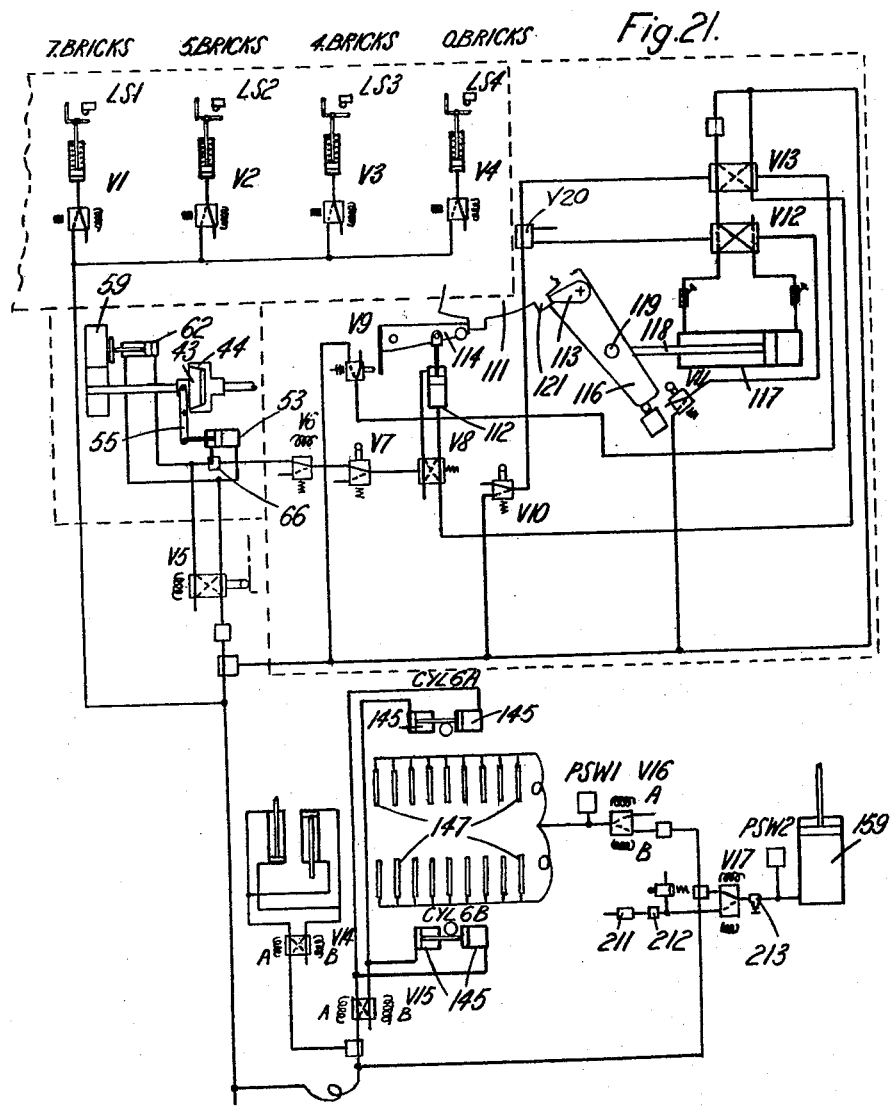

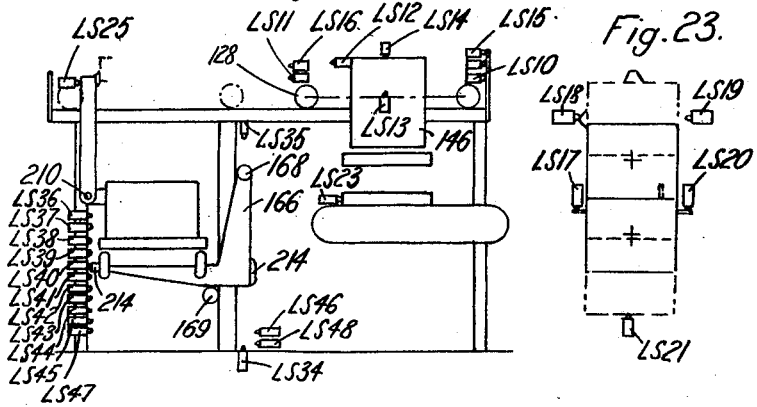
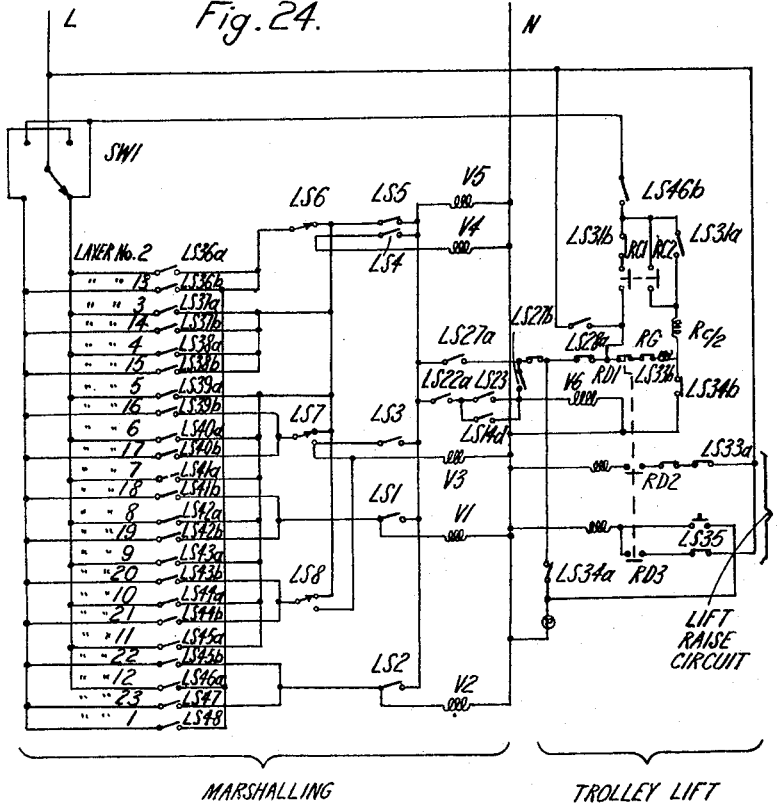

May 14, 1963 J. PAISLEY 3,089,577
APPARATUS FOR MARSHALLING A GROUP OF ARTICLES IN SPACED ROWS
Filed Sept. 27, 1960 15 Sheets-Sheet 14

23rd
22nd
21st
20th
19th
18th
17th
16th
15th
14th
13th
12th
11th
10th
9th
8th
7th
6th
5th
4th
3rd
2nd
1st

INVENTOR
John Paisley
BY
Watson, Cole, Grindle & Watson
ATTORNEYS

May 14, 1963   J. PAISLEY   3,089,577
APPARATUS FOR MARSHALLING A GROUP OF ARTICLES IN SPACED ROWS
Filed Sept. 27, 1960   15 Sheets-Sheet 15
FIG.27.  FIG.28.
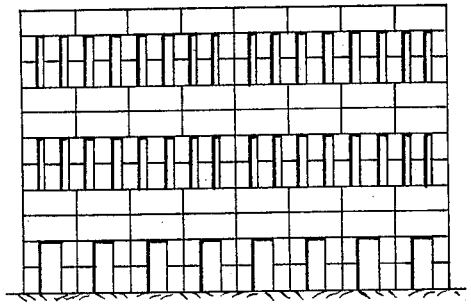
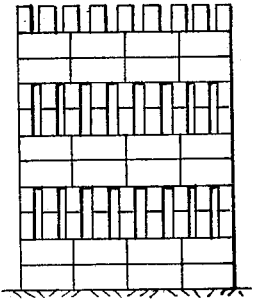
FIG.29.  FIG.30.
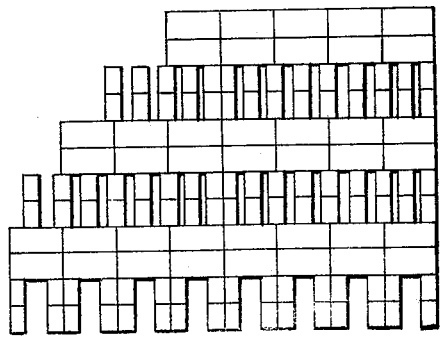
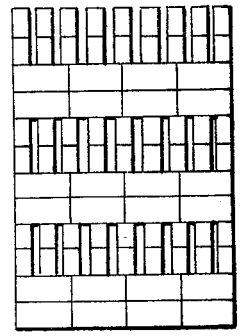
INVENTOR
John Paisley
By
Watson, Cole, Grindle & Watson
ATTORNEYS United States Patent Office 3,089,577
Patented May 14, 1963

3,089,577
APPARATUS FOR MARSHALLING A GROUP
OF ARTICLES IN SPACED ROWS
John Paisley, London, England, assignor to Eastwoods
Limited, London, England, a British company
Filed Sept. 27, 1960, Ser. No. 58,820
7 Claims. (Cl. 198—31)

This invention relates to apparatus for marshalling a group of articles in spaced rows and particularly for marshalling a layer of building bricks preparatory to the layer receiving another layer above it or being placed upon a previously formed layer so as to form a stack of bricks appropriately spaced for firing in a kiln. The invention however, is applicable to marshalling other articles in addition to bricks and which are of approximately the same size to one another.

According to this invention an apparatus for marshalling a group of articles in spaced rows comprises a platform for receiving the articles, means for imparting a step-by-step rectilineal movement to the platform for a predetermined number of steps, means for feeding articles successively end to end in a row on to the platform between the steps of the step-by-step movement in a direction transverse to that movement and means for removing a number of rows simultaneously from the step-by-step moving platform while maintaining their spaced relationship after the aforesaid predetermined number of step-by-step movements have taken place.

The aforesaid receiving platform may be in the form of an endless chain encircling sprocket wheels fixed to spaced shafts and means may be provided for imparting step-by-step rotation to one of said shafts.

In such an arrangement the said endless chain may be provided with a number of pairs of spaced guide rails for accommodating rows of articles, the ends of which pairs of rails are brought by the step-by-step movements successively opposite the means for feeding a row or articles between them.

A number of stop means may be mounted on a fixed part of the apparatus over the receiving platform and spaced apart along the line of feeding of a row of articles, and selector means may be provided for bringing any one of said stop means into the path of movement of the leading article of the row, which stop means may be arranged to arrest the feed.

The means for feeding a row of articles on to the receiving platform may comprise an endless conveyor extending transversely to the line of step-by-step movement of the receiving platform.

The said row of articles shortly before reaching the receiving platform may be arranged to pass through a guide having means for arresting an article.

The aforesaid endless conveyor may be driven through a disengageable clutch and the said stop means may be arranged to control the operation of the article arresting means and of the clutch.

The operation of the means for imparting step-by-step movement to the receiving platform may be initiated through a delay action device by the actuation of the article arresting means and clutch.

The aforesaid selector means for bringing any one of said stops into the path of movement of the leading article may be controlled by said means for imparting step-by-step movement.

The means for removing the rows of articles from the platform while maintaining their spaced relationship may comprise a trolley carrying grippers arranged to grip the articles and the wheels of which trolley engage rails on the fixed part of the structure and are driven by a motor on the trolley.

The aforesaid grippers may be carried by a mounting having means for raising and lowering it with respect to said platform and said motor is started by means controlled by the upward limit of movement of the mounting for the grippers and is arrested by means controlled by the outward limit of movement of the trolley and the upward movement of the mounting for the grippers after depositing the articles away from the apparatus initiates and reverses the direction of rotation of the motor returning the trolley to its initial position.

The following is a description of a marshalling apparatus which is applicable to a machine for setting up and stacking bricks reference being made to the accompanying drawings in which:

FIGURE 1 is a plan view showing the general arrangement of the plant;
FIGURE 2 is a side elevation of the conveyor shown to the left of FIGURE 1 for feeding the bricks to the marshalling feed conveyor;
FIGURE 3 is a side view of the part of the apparatus to the right of FIGURE 1 looking in the direction of the arrows 3—3;
FIGURE 4 is a vertical section through the marshalling feed conveyor on the cranked line 4—4 of FIGURE 5;
FIGURE 5 is a section on the line 5—5 of FIGURE 4;
FIGURE 6 is a side elevation of the marshalling conveyor;
FIGURE 7 is a vertical section on the line 7—7 of FIGURE 6;
FIGURE 8 is a vertical section on the line 8—8 of FIGURE 7;
FIGURE 9 is a part section on the line 9—9 of FIGURE 6 on a reduced scale;
FIGURE 10 is a plan view of the arrangement shown in FIGURE 9;
FIGURE 11 is an end elevation of the indexing mechanism controlling the movement of the marshalling conveyor;
FIGURE 12 is a section on the line 12—12 of FIGURE 11;
FIGURE 13 is a part vertical section and part elevation of the gripper frames and the structure which supports them;
FIGURE 14 is a plan of the arrangement shown in FIGURE 13;
FIGURE 15 is a view looking from the left of FIGURE 13;
FIGURE 16 is a side view of a pair of gripping members and their supporting bar and pneumatic operating means;
FIGURE 17 is a view looking from the left of FIGURE 16;
FIGURE 18 is a sectional plan on the line 18—18 of FIGURE 17;
FIGURE 19 is an elevation of the transfer carriage and the lift mechanism looking in a direction along the direction of movement of the marshalling conveyor;
FIGURE 20 is a view looking from the left of FIGURE 19;
FIGURE 21 shows the pneumatic circuit associated with the marshalling feed conveyor, the marshalling conveyor and its indexing mechanism, and gripper unit together with certain of the electric line switches;
FIGURE 22 is a diagrammatic side elevation of the marshalling conveyor, transfer carriage and lift showing the positions of certain of the pneumatic contact valves;
FIGURE 23 is a diagrammatic plan view of the gripper frames showing the position of certain of the pneumatic control valves and electric line switches;
FIGURE 24 shows the electric circuit associated with the marshalling conveyors and lift;

FIGURE 27 is a front view of the lower stack after formation in the apparatus;

FIGURE 28 is a side view of the lower stack;

FIGURE 29 is a front view of the upper stack after formation in the apparatus; and FIGURE 30 is a side view of the upper stack.

Figure 4:
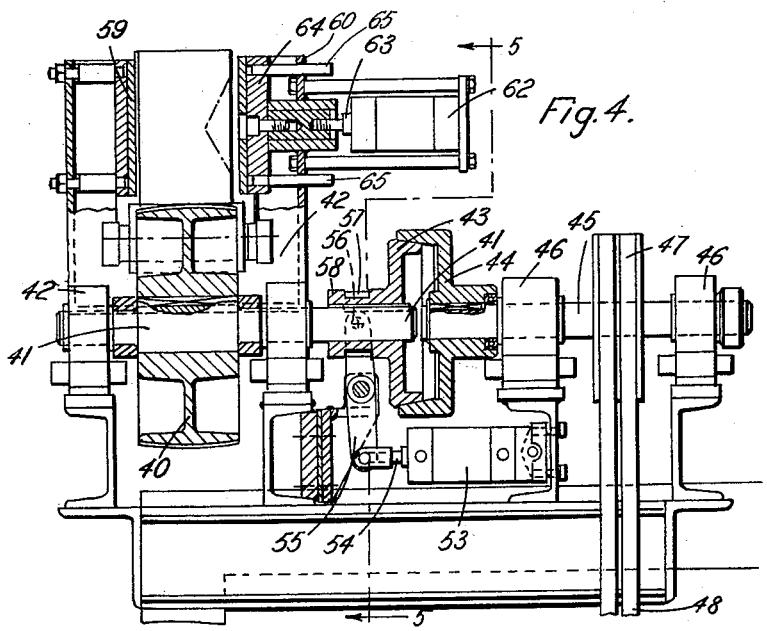

Referring to FIGURES 1 and 2, three brick presses are arranged side by side each of which deposits bricks, in pairs frog uppermost and spaced apart end to end lengthwise, onto and across a downwardly inclined gravity feed roller conveyor 10, the three conveyors being arranged parallel to one another. The three conveyors feed pairs of bricks successively under the control of sequencing mechanism 11 so that they fall edge on upon a first endless band conveyor 12 the bricks being disposed lengthwise end to end along the belt.

The lower stretch of the endless band of the first endless band conveyor 12 is provided with a conventional tensioning device 31 (FIGURE 2) and is driven by a variable speed motor 32 at the discharge end. The first endless band conveyor discharges the bricks on to the upper end of a second inclined gravity feed roller conveyor 33 the lower end being pivotally mounted at 34 on a fixed part of the structure and the upper end of which is spring mounted at 35. Up and down movement of the upper end of the second roller conveyor 33 consequent upon varying number of bricks on that conveyor is arranged to actuate speed control mechanism for the motor 32 whereby the rate of feed of the first endless band conveyor is appropriately adjusted. One of the shafts of the conveyor has fixed to it cam mechanism 215 (FIG. 2) which controls the rate of operation of the brick sequencing mechanism in accordance with the speed of the conveyor 12. Fixed guide rails 37 extend on either side of the gravity feed roller conveyor 33.

The bricks pass off the end of the second gravity feed roller conveyor 33 on to a second endless band conveyor 38 hereafter referred to as the marshalling feed conveyor.

Figure 5:
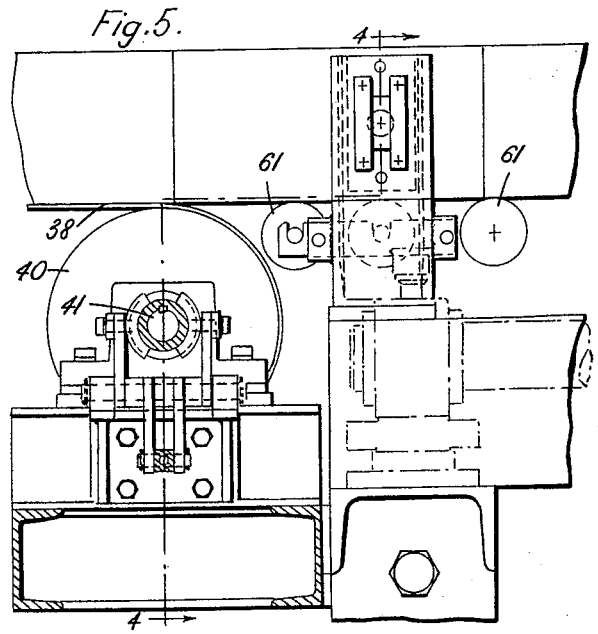

The band of the marshalling feed conveyor (see FIGURES 1, 3, 4 and 5) encircles two pulleys 39, 40 the first pulley 39 nearest the gravity feed roller conveyor being fixed to a shaft which rotates co-axially with the pivotal mounting 34 and the other pulley 40 being fixed to a spindle 41 (FIGURE 4) which is supported by bearings 42 and which extends beyond one of them and has slidably keyed to its projecting end one part 43 of a cone clutch. The other part 44 of the cone clutch is fixed to a shaft 45 carried by bearings 46 and has also fixed thereto a driving pulley 47. The driving pulley is encircled by a belt 48 which encircles another pulley 49 (FIGURE 3) on a shaft 50 driven through gearing 51 from a motor 52 so that the speed of drive to the marshalling feed conveyor belt is about sixty feet per minute. The moving element 43 of the cone clutch is actuated by a pneumatic motor 53 the piston rod 54 of which is pivotally connected to one end of a rocking lever 55 the other end of which is forked and is provided with pins 56 engaging a circumferential groove 57 in a hub portion 58 of the clutch element. The bricks pass off the pulley 40 and the band 38, between two guides 59, 60, first onto two supporting rollers 61 (FIGURE 5) arranged with their axes transverse to the length of the bricks and then onto a marshalling conveyor described later.

One of the aforesaid guides 60 has association there with a pneumatic motor 62 the piston rod 63 of which has fixed thereto a clamping plate 64 which may clamp a brick against the guide 59 and thus arrest the oncoming line of bricks being fed by the marshalling feed conveyor. The clamping plate is provided with guide pins 65 which engage guide holes in the guide 60.

The pneumatic motors 62 and 53′ are controlled by electromagnetically operated valves V5, V6 (see FIGURE 21) which are re-set by an indexing mechanism described later. Also associated with the motor 53′ is a sequence valve 66.

The marshalling conveyor (see FIGURES 6–9) which is located at the upper part of the right hand end of FIGURE 1 comprises a number of pairs of guide rails 67 which are fixed to alternate links 68 of each of a number of chains which links are connected to other links 69 by pins 70 encircled by rollers 71 (FIGURE 8). It will be noted certain of the guide rails are wider than the others and one of the links 72 is provided with a single guide rail 73 to enable a standard pitch chain to be employed and yet provide the required spacing of the rows. The chains each encircle two sprocket wheels 74, 75 (FIGURE 6) fixed to shafts 76, 77 carried by bearings 78, 79 fixed to the frame 80 of the apparatus and the upper stretch of each chain, in passing from one sprocket wheel to the other, is supported by its rollers 71 coming into engagement with a guide 81 (FIGURE 8) fixed to said frame.

The shaft 77 is driven step-by-step by indexing mechanism described later.

Each guide rail 67 has fixed to its inner edge a number of brackets 87 (FIGURE 9) on which are mounted rollers 88 engaging tracks 89 on the frame of the machine.

As the chains pass off the sprockets 74, a pair of the guide rails 67 move above and opposite a series of rollers 82 (FIGURES 8 and 9) arranged with their axes transverse to the axes of the shafts 76, 77 and parallel to the axes of the rollers 61 which series of rollers extend across the marshalling feed conveyor. As will be seen from FIGURE 8 the rollers 82 are mounted on spindles 83 carried by angle irons 84 fixed to a frame member 85 of the machine. When a pair of guide rails 67 is brought, by the step-by-step movement of the marshalling conveyor, into line with the rollers 61 and 82 a predetermined number of bricks, according to the operation of certain stops described later, is fed between the guide rails and roll along the rollers and when the marshalling conveyor moves the next step the line of bricks is carried on to groups of slats forming part of a secondary endless conveyor (see FIGURES 6 and 12). The secondary conveyor is driven step-by-step by the shaft 77. Each group of the slats is made up of three slats 90, 91, 92 (FIGURE 7) arranged in line and the slats in one group are linked to the slats in an adjacent group by pivoted links 93, the slats being provided with lugs 94 which engage the pivot pins of the links. The pivotal connections of the links embody rollers 95 which engage teeth of sprocket wheels 96, 97 secured to the shaft 77 and 98 respectively.

Assuming the marshalling conveyor is stationary and the clamping plate 60 of the marshalling feed conveyor is disengaged, a row of bricks will be fed on to the marshalling conveyor between two of the guide rails 67 by the conveyor 38 which is automatically declutched by the clutch 43, 44 (FIGURE 4) when a leading brick engages one of a number of stops described later. The clamping plate 60 is then operated to arrest the feeding of the bricks, the indexing mechanism then operates to move the marshalling conveyor one step so that the next pair of guide rails 67 are opposite the marshalling feed conveyor whereupon the clamping plate 60 is released and another row of bricks is fed onto the marshalling conveyor and so on. The length of the supported part of the upper stretches of the chains and the upper stretch of the slatted conveyor are sufficient to accommodate nine rows or lines of bricks and the number of bricks in each row may be up to eight. The number of bricks in a row or line is controlled by a series of stops movably mounted on a fixed part of the structure 99 (see FIGURE 10) so that they may be selectively projected into the path of the movement of the bricks between the guide rails 67 when stationary opposite the marshalling conveyor. Four of such stops are provided two of which are illustrated in full and two partly illustrated in FIGURE 10. The four stops are operated by small pneumatic motors 100 controlled respectively by solenoid operated valves V1, V2, V3, V4 (see FIGURE 21). Each of the stops comprises a bell crank lever 101 (FIGURE 10) pivotally mounted at 103 on a head 104 fixed to the piston rod 105 of the motor. The lever arm is urged to one limiting position on the head by a spring 105 and when in this position one arm 101 of the lever is spaced away from a stop 107. When a motor is energised to bring the lever arm 101 into the path of the bricks, an abutment 108 on the other lever arm 102 will operate one of the microswitches LS1, LS2, LS3, LS4 (shown in FIGURES 21 and 24), when bricks have struck arm 101 causing it to make contact with the stop 107. Another bell crank lever 109, 110 is arranged at the end of the guide rails having its arm 109 permanently in the line of the travel of the bricks and its other arm operating another microswitch LS5 (FIGURE 24). The various microswitches serve to initiate the movement of the indexing mechanism about to be described whereby the marshalling conveyor is moved one step to bring another pair of the guide rails opposite the marshalling feed conveyor to receive another row of bricks.

Figure 11:
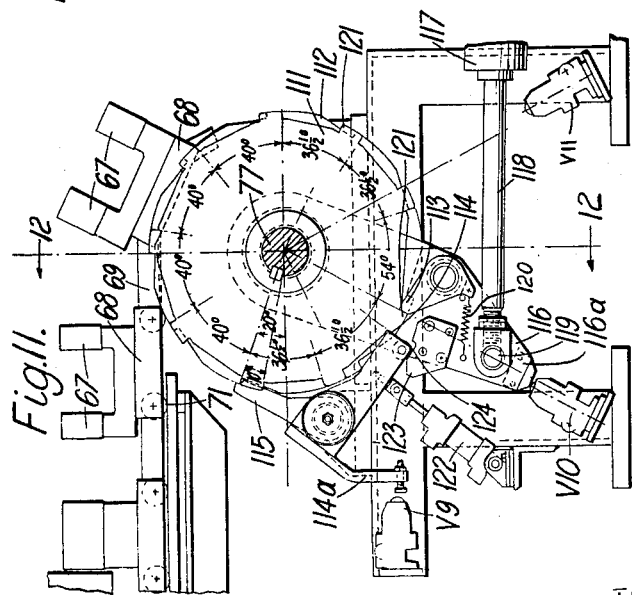

The indexing mechanism (see FIGURES 11 and 12) for controlling the step-by-step movement of the marshalling conveyor comprises toothed wheels 111 and 112 both fixed to the shaft 77. The former wheel 111 has associated therewith two pawls 113, 114 and the latter toothed wheel 112 has associated therewith a single pawl 115 which is pivoted co-axially with pawl 114 and is movable independently thereof and is spring pressed towards the toothed wheel 112. The pawl 113 is pivoted between two arms 116 which swing about the shaft 77 and is operated by a pneumatic motor 117, the piston rod 118 of which is pivotally connected to the arm at 119. The pawl 113 has associated with it a spring 120 which enables the pawl to snap past a tooth on the wheel 111 upon return movement of the arms 116.

The length of the stroke of the motor 117 is such that after the pawl 113 has engaged one of the teeth 121 and moved it the required distance clockwise the pawl 113 can then return and snap over to the rear of the next tooth 121 and during this movement the shaft 77 is prevented from being rotated in the reverse direction by the pawl 115 being spring pressed into engagement with the ratchet wheel 112. The extent of step-by-step clockwise movement of the toothed wheel 111 is accurately controlled by the second pawl 114 which shortly before the end of the stroke of the piston rod 118 is brought into the path of travel of the tooth 121 by another pneumatic motor 122 assisted by a nose piece 123 on the arms 116. The nose engages a roller 124 on a part of the pawl 114 which pawl 114 is subsequently withdrawn by motor 122 (FIGURE 21) when the first pawl 113 has withdrawn to engage another tooth and is about to move it. The pneumatic motor 122 in withdrawing the pawl 114 actuates a valve V9 described later. One of the arms 116 carrying the first pawl 113 is provided with an extension 116a which at opposite limits of its travel engages control valves V10 and V11 whereas the other arm 116 is provided with an extension 116b (FIGURE 12) which controls valve V5 and V7 (shown in FIGURE 21), the functions of which four valves are described later.

The withdrawal of the pawl 114 is arranged to operate the valve V9 through an arm 114a fixed to the pawl. The toothed wheel 111 is provided with nine teeth 121 one tooth for each row of bricks.

The flow of air to and from opposite ends of the pneumatic motor 117 is controlled by pneumatically operated changeover valves V12, V13 (FIGURE 21) which are themselves controlled respectively by valves V11 and V9 and a sequence valve V20 controlled by the valve V10 while the pneumatic motor 122 is controlled by a pneumatically operated changeover valve V8 which in its turn is controlled by the valve V7. The functioning of which valves is described later.

The marshalling conveyor is arranged beneath a pair of gripper frames 126 (see FIGURES 3, 13, 14, 15) arranged side by side across the width of the marshalling conveyor and carrying a number of pairs of grippers 127 arranged in rows spaced apart in corresponding manner to the spacing apart of the pairs of guide rails 67 on the marshalling conveyor and there being nine rows of grippers on each frame with four pairs of grippers in each row.

The gripper frames 126 are so mounted on a transfer trolley 128 (FIGURE 3) that they may be raised, lowered and rotated in relation to the carriage and to the marshalling conveyor.

At the commencement of a cycle when the marshalling conveyor is empty of bricks the gripper frames 126 are in an elevated position. The clamping plate 60 associated with marshalling feed conveyor is released, a row of bricks is fed between two of the guide rails 67 on the marshalling conveyor. The clamping plate 60 again comes into operation, the indexing mechanism then operates to move the marshalling conveyor one step the clamping plate 60 is again released, and feeds a row of bricks between the next pair of guide rails 67. The clamping plate 60 is again operated, the marshalling conveyor is moved a further step and so on until nine rows of bricks have been accumulated on the marshalling conveyor. At this stage the gripper frame descends so that the pairs of grippers 127 straddle the bricks, the grippers then close on the bricks and the frame is again raised. Each of the gripper frames 126 is fixed to a spindle 129 (FIGURE 13) mounted to rotate about a vertical axis in a bearing 130 fixed to a part 131 supported by a carriage 132. The wheels 132a of the two carriages engage channel-shaped rails 133 on a superstructure 146 (FIGURE 19) which in its turn is so mounted on the transfer trolley 128 (FIGURE 19) as to be movable in an up and down direction (as hereinafter described) and which trolley is movable horizontally in the same direction as the step-by-step movement of the marshalling conveyor.

As indicated above each gripper frame 126 has nine rows of pairs of gripper members 127 with four pairs in each row. The two carriages 132 are moved towards and away from one another in a direction across the width of the marshalling conveyor by two pneumatic motors 134, 135 (FIGURE 14). The motors are mounted side by side on a cross member 136 which latter is fixed to the rails 133. The plungers 137, 138 of the motors project from opposite ends of the motor assemblage and bear on adjustable abutments 139, 140 on the two carriages 132 respectively. The two carriages are connected by pivoted links 141, 142 to opposite ends of a lever arm 143 pivoted intermediate of its ends by a pin 144 to the cross member 136 whereby the movements of the carriages are equalised. Rotary movement is imparted to the spindle 129 of each gripper frame 126 by a suitable pneumatic motor 145 having cylinders 6A and 6B as indicated in FIGURE 21. Thus when it is desired to orient the bricks elevated by the gripper frames so that the rows of bricks extend in a direction at right angles to those previously raised the two carriages 132 are moved apart by the two pneumatic motors 134, 135, the two spindles 129 rotated through ninety degrees and the two gripper frames 126 moved together again.

Figure 19:
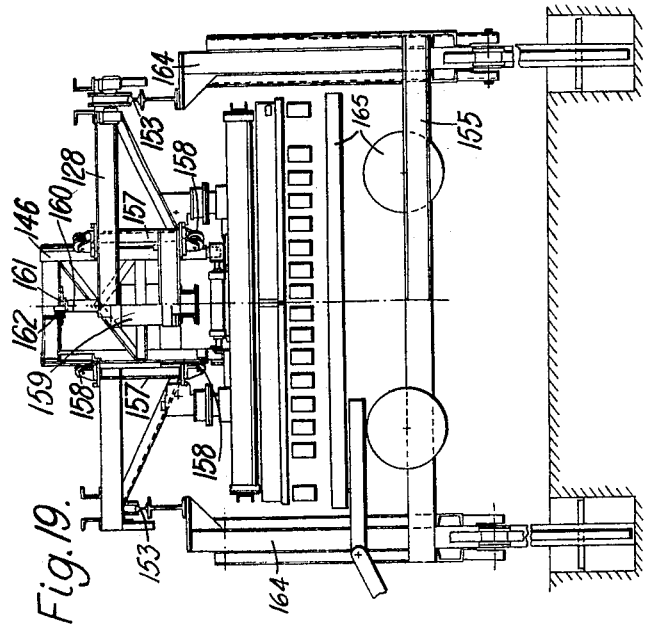

Extending between opposite frame members of each rectangular gripper frame are nine expansible resilient bolsters 147 (FIGURE 15) one over each row of bricks and extending between the other opposite frame members are four cross bars 148 extending over each of the four bricks in each row. Each cross bar 148 extends through apertures 149 (FIGURE 16) in each of two gripping members 127 associated with each brick. The aperture in each gripping member is flanked by two lugs 150 and the two lugs of one gripping member overlap those of the other gripping member and these lugs are provided with registering holes through which extend a pivot pin 151 fixed to the cross bar 148. The limbs on the gripping members on one side of each pivot pin are arranged to grip the brick while the other ends straddle one of said bolsters 147. Springs 152 are connected between the cross bar 148 and gripping limbs so as to tend to draw them apart. The gripping members are closed and opened in the required time relationship, the first action under the control of a double pole limit switch LS13, the latter controlling valves V16A and V16B (FIGURE 21) allowing pressure to be built up in the bolsters 147. When the pressure builds up it actuates a pressure responsive switch PSW1 (FIGURE 21) which in its turn electrically controls a valve V17 associated with the motor 59 for lifting the gripper frames. The opening of the grippers is effected by release of pressure on them when the gripper frame descends and when pressure in a cylinder 159 diminishes and operates a pressure responsive switch PSW2 which opens the bolsters to exhaust. The transfer trolley 128 shown in FIGURE 19 is arranged to run on rails 153 which extend from a position above the marshalling conveyor to a location above the top of a lift structure 164 (FIGURE 20) where the bricks are unloaded on to a platform 165 which is lowered step-by-step by the lift.

The transfer trolley comprises a rectangular frame 128 on wheels 156 engaging said rails 153. Depending from the frame are two structures 157 each having four guide rollers 158 at the top and four guide rollers 158 at the bottom and which engage four upright members of the structure 146 from which the superstructure of one of the gripping frames is suspended. Each depending structure 157 (FIGURE 19) also has attached to it the vertically disposed cylinder 159 of a pneumatic motor, the plunger 160 of which engages an abutment 161 on a cross bracing 162 at the upper ends of the aforesaid upright members of the structure 146 whereby the gripping frames 126 may be raised or lowered. One end of the rectangular frames 128 of the transfer carriage supports an electric motor 163 (FIGURE 20) which drives, through gearing, a shaft on which two of the wheels 156 of the trolley are fixed.

The rails 153 at one end are supported by four uprights 164 of the lift structure, up two of which is guided the platform 155 which carries the support 165 (which may be in the form of a trolley) onto which the bricks are deposited by release of the gripping members.

The platform 155 (FIGURE 20) is provided on each side thereof with upward and downward extensions 167 having wheels 168 which engage in the outer and inner sides of two of the uprights 164.

As will be seen from FIGURE 22 a number of line switches LS36 to LS47 are arranged one above the other and are arranged to be engaged by a cam 124 on the platform of the lift as it reaches each level and these switches control valves which in their turn control the operation of the stops 101 associated with the marshalling feed conveyor.

In order to build up successive layers of bricks the marshalling feed conveyor feeds the bricks end to end lengthwise on to the marshalling conveyor which is traversed step-by-step until eight spaced rows each of up to eight bricks are formed according to the setting of the stops 101, the two gripping frames then descend and the grippers grip the rows of bricks and the frames are raised rotated through 90° and are moved by the transfer trolley over the lift whereupon the gripping frames descend, the grippers release the bricks on to the support or on to a truck on the lift and after the first two layers have been deposited the grouping frame comes into operation. In the meantime the next eight rows of bricks are being assembled on the marshalling conveyor and the transfer trolley returns the gripping frame back again over them. The frames are again lowered, the grippers grip the rows of bricks and the frames are elevated without rotation whereupon the transfer trolley moves them over the lift where they are lowered and grippers opened to deposit the bricks, so that they extend across the bricks of the first layer. The platform descends and the transfer trolley again returns and picks up the next layer without the frames being rotated and so on.

If a square stack of bricks is to be formed the same number of bricks are fed by the marshalling feed conveyor for each cycle but where the roof is arch shaped, which is usually the case the number of bricks on the upper layers require to be diminished.

Figure 25:
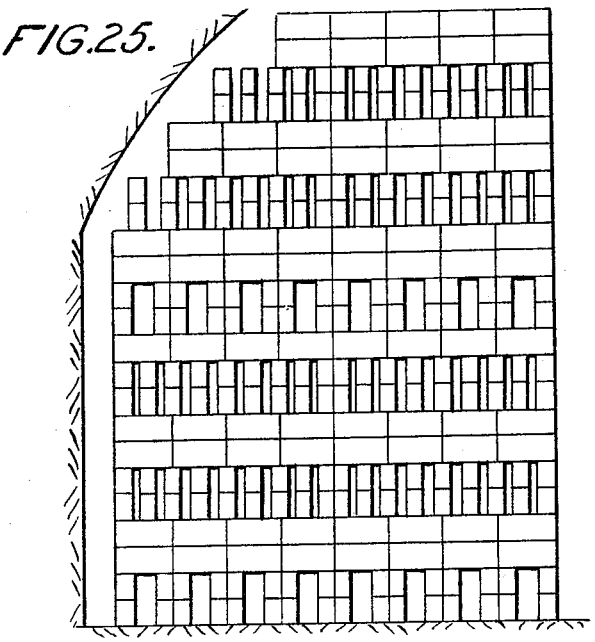
FIGURE 25 is a front view of the lower and upper stacks which, after being formed in the apparatus are superimposed and accommodated in the kiln chamber at one side thereof.
Figure 26:
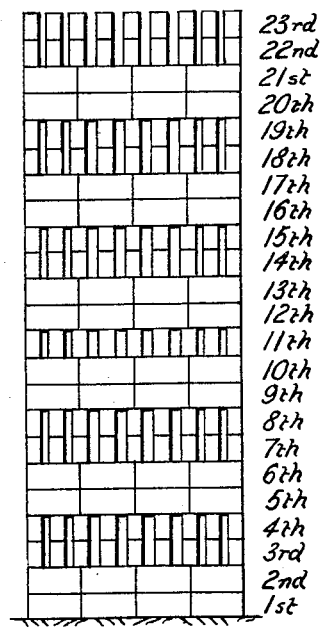
FIGURE 26 is a side view of the superimposed stacks.

Referring to FIGURES 25 to 30, in the case of a kiln chamber having an arched roof it is convenient to build up each half of the kiln on one side of a vertical central plane extending along the length of the kiln to the full height in two stages so that the marshalling conveyor is arranged to feed, to the lift, two successive stacks each of about one half the height of the kiln and half the width as shown in FIGURES 25 and 26. In the present instance the lower stack has eleven layers and the upper one has twelve layers and each stack is half the width and height of the kiln. In the two superimposed stacks containing the twenty-three layers there are two forms of layer to be marshalled. In the following description a reference to a row of bricks means a number of bricks arranged end to end and which when viewed from an end appear as headers and when viewed from a side appear as stretchers.

The two forms of layer are as follows:

(a) Those in which when first marshalled comprises nine rows of equal numbers of bricks, e.g. eight end to end, but which when engaged by the gripping heads and rotated may produce eighteen rows of four bricks end to end.

(b) Those in which when first marshalled there are rows containing a various number of bricks arranged end to end.

The marshalled layers which fall into the category $a$ are 3, 4, 5, 6, 7, 8, 9, 10, 11, 14 and 15 and which when gripped by the gripping head and in some cases rotated produce the following numbers of rows: layers 3 and 4 have nine rows of eight bricks; layers 5 and 6 have eighteen rows of four bricks; layers 7 and 8 have nine rows of eight bricks; layers 9 and 10 have eighteen rows of four bricks; layers 11, 14 and 15 have nine rows of eight bricks; layers 18 and 19 have nine rows of seven bricks; layers 22 and 23 each have nine rows of five bricks.

The layers falling into category $b$ are numbers 1, 2, 12 and 13 each when initially marshalled have eight rows of eight bricks and one empty row and which after being gripped by the gripping heads and rotated produce sixteen rows of four bricks in each of the layers.

Also in the same category $b$ are layers 16 and 17 each with eight rows of eight bricks and one row of four bricks, and after being gripped and rotated by the gripping head produce seventeen rows of four bricks.

Layers 20 and 21 each provide for five rows of eight bricks which when rotated form ten rows of four bricks and which together with four rows of four bricks makes a total of fourteen rows of four bricks.

The layers falling into category $a$ are marshalled by arranging the movement of the lift to actuate directly switches in circuit with the means which actuate the required stops and maintaining this contact until the layer is completed.

Those in category $b$ are marshalled under the control of one of the intermediary switches LS6, LS7 or LS8 these being controlled by one of a number of cam plates 207, 208, 209 moving round under the action of the indexing mechanism shaft 77.

As there are only three layer forms in category *b* it will be seen that complete control of the brick pattern in any layer can be achieved by providing a switch for each layer controlled by the movement of the lift viz. switches LS36 to 48 plus the three switches LS6, LS7 and LS8, each operated by one of the aforesaid cam plates 207, 208, 209 attached to the indexing mechanism.

The layer selection for two successive stacks is controlled by thirteen switches (FIGURE 24) of which 36 to 45 are double pole switches the two poles of each of which are layer selecting circuits. The other switch 46 being a double pole switch of which one pole deals with layer selection in one of said two circuits and the other pole is in the lift control circuit. The other switches 47, 48 are single pole switches so connected in circuit to select the bottom layers of the two stacks. These switches are all operated by the trolley lift (see FIGURE 22) thus ensuring the correct build up of any half stack.

The number of bricks in a line, if less than eight, is controlled by energising one of the four solenoid controlled valves (V1, V2, V3 and V4) controlling the stop motors. This causes the particular stop 101 to project into the path of bricks entering the marshalling conveyor, and when struck, causes V5 to become energised.

The energisation of the valve V5 causes pneumatic motor 62 to clamp on the first brick outside the marshalling area and pneumatic motor 53 to disconnect the marshalling feed conveyor clutch. The pressure build-up after completing the above produces pressure in the pilot line through to V8 which controls the motor 112 for the locating pawl 114 (V6 is de-energised i.e. open and V7 is held open by main indexing arm 116), thus there is a delay before the indexing mechanism operates.

The opening of V8 causes pneumatic motor 122 to pull the location pawl 114 clear of indexing wheel 111; in doing so V9 is depressed thus reversing V13.

The reversal of V13 changes over the supply lines to pneumatic motors 122 and 117, which operate respectively the locating pawl 114 and the indexing wheel engaging arm, the latter pneumatic motor 117 receiving a high pressure supply to move the marshalling conveyor along one step. V7 is released when the conveyor has been moved a short distance.

The release of V7 connects the pilot line to V8 to exhaust. V8 thus reverses under spring pressure.

When V8 is reversed the pawl 114 is moved forward by the pneumatic motor 122 under low pressure; this is assisted in its final location by a nose piece 123 on the indexing arm 116. During the last part of the indexing motion V5 which controls the marshalling feed conveyor is reset and V10 is depressed by the indexing arm 116. (Note V5 was de-energised by way of the stop switches LS1 to LS5 being released as the bricks holding it in contact were moved out of the line of the marshalling feed conveyor by the step-by-step movement of the marshalling conveyor.)

The resetting of V5 causes clamping plate 64 to open and the marshalling feed conveyor to become operative thus allowing bricks to enter marshalling area.

The depression of V10 causes V13 controlling the motor for the pawl 114 to reset thus supplying pneumatic motor 122 with high pressure supply and cylinder 4 with low pressure supply, when this is completed pressure passes through the sequence valve to reverse V12.

The reversal of V12 causes the "indexing arm 116" to move away from the location pawl 114, this will continue to do so until V11 is depressed. This will reset V12, thus sending the indexing arm 116 forward once again, but still under low pressure. The indexing arm will finally come to rest when the pawl 113 makes contact with the next tooth position 121 on the indexing wheel, having completed a cycle.

In indexing, the plate cams will have pre-selected the next step through one of the switches LS6, 7 or 8 or 22 (see FIGURES 12 and 24) in conjunction with one of the switches LS36 to 38 controlled by the lift if a change in the number of bricks is necessary.

When the layer is completed the lift position will re-select the next layer.

A switch LS22 will be operated by a cam on the indexing mechanism when the first row of a fresh layer is being filled. A second switch LS23 (see FIGURE 22) will be made by coming into contact with a completed layer of bricks.

The closing of the contacts LS22 (see FIGURE 24) and of the contacts of the switch LS23 will energise the lock out valve V6 thus preventing any further indexing since the pawl 114 cannot be withdrawn by its motor which is now connected to exhaust until the completed layer has been lifted clear.

The closing of the switch contacts LS22 by the cam disc 210 completes the circuit which causes the gripper frames to be lowered by exhausting pneumatic motor 159. Contact between LS14 and gripper lifting framework is broken which brings in an additional switch LS14d, the function of which is described later.

When the gripper frames reach the extreme "down" position they close certain contacts which control valves which permit air to pass into the bolsters 147 causing the grippers to close on the bricks via valve V16b (FIGURE 21). A pressure build-up in the air bolster circuit operates the pressure switch PSW1, thus changing the circuit to pass through contact points *a* and *c*. This allows V17A to become energised causing gripper lifting motor 159 to raise the gripper frames.

The line switch LS23 will open as soon as the bricks start to leave the marshalling area but V6 (FIGURE 21) is maintained energised closed via LS14d (FIGURE 24).

This latter switch opens when the grippers are fully raised. This breaks the supply through to V6 thus allowing indexing of marshalling mechanism to continue.

Each layer of bricks has to be deposited on to the trolley in the lift in one of two ways i.e. as rows of "Headers" or "Stretchers." As "Stretchers," the bricks are simply transferred to the trolley in the form in which they are received by the marshalling conveyor without further manipulation but to obtain a layer of "Headers" the layer accumulated by the marshalling conveyor must be split half way along the lengths of a full layer. This is effected by rotating the two gripping frames through 90° after they have been raised.

The formation of a layer of headers is determined by LS9 being operated by each of a number of cams 255 (FIGURE 3) when the trolley lift is in any of a number of predetermined positions.

A complete brick setting machine to which the present invention is applicable together with its electric and pneumatic controlling circuits is described and illustrated in the specification of application No. 58,246.

I claim:

1. An apparatus for marshalling a group of articles in spaced rows comprising a step by step moving and receiving platform for the articles, a feed conveyor extending laterally from one edge of the platform and moving transversely to the step by step motion thereof, which conveyor accommodates a single line of articles end to end thereon, a clamp arranged at the end of the conveyor adjacent the edge of said receiving platform and having clamping members between which the articles pass on their way on to the receiving platform, indexing mechanism for imparting said step by step motion, a motor and transmission for driving said conveyor, which transmission embodies a clutch, power means for engaging and disengaging said clutch, actuating means for imparting closing and opening movement to said clamping members, control means arranged over the marshalling platform in the path of movement of the row of articles being fed onto it, which control means are adapted to be engaged by a leading article and when so engaged are adapted to condition the clamp actuating means to close the clamp and thereby arrest the feed of the articles and also to condition the clutch actuating motor to disengage the clutch and which clamp and clutch condition a control for said indexing mechanism whereby a step of movement is imparted to the receiving platform and which movement conditions means for disengaging the clamp and engaging said clutch whereby a further row of articles is fed on to the receiving platform.

2. An apparatus according to claim 1 wherein said control means is arranged in the path of step by step movement of the marshalled rows of bricks which control means condition a lock out device rendering the indexing mechanism inoperative when a predetermined number of rows have been marshalled.

3. An apparatus according to claim 1 wherein the receiving platform is in the form of an endless chain encircling sprocket wheels fixed to spaced shafts and means may be provided for imparting step-by-step rotation to one of said shafts.

4. An apparatus according to claim 3 wherein said endless chain is provided with a number of pairs of spaced guide rails for accommodating rows of articles, the ends of which pairs of rails are brought by the step-by-step movements successively opposite the means for feeding a row of articles between them.

5. An apparatus according to claim 1 wherein a number of stop means are mounted on a fixed part of the apparatus over the receiving platform and spaced apart along the line of feeding of a row of articles and selector means are provided for bringing certain of said stop means into the path of movement of the leading article of the row, which stop means are arranged to arrest the feed.

6. An apparatus according to claim 1 wherein the operation of the indexing mechanism for imparting step-by-step movement to the receiving platform is initiated through a delay action device by the actuation of the clamp and clutch.

7. An apparatus according to claim 5 wherein the selector means for bringing any one of said stops into the path of movement of the leading article may be controlled by said means for imparting step-by-step movement.

References Cited in the file of this patent

UNITED STATES PATENTS

| | | |
|---|---|---|
| 1,900,243 | Layer | Mar. 7, 1933 |
| 2,955,717 | Segur | Oct. 11, 1960 |